United States Patent
Winter et al.

(10) Patent No.: US 12,107,287 B2
(45) Date of Patent: Oct. 1, 2024

(54) FIRE PROTECTION DEVICE WITH A COMPOSITE SYSTEM, COMPOSITE SYSTEM AND BATTERY PACK WITH A FIRE PROTECTION DEVICE

(71) Applicant: Cuylits Holding GmbH, Bersenbrück (DE)

(72) Inventors: Florian Winter, Osnabrück (DE); Diederik Cuylits, Bersenbrück (DE)

(73) Assignee: Cuylits Holding GmbH, Bersenbrück (DE)

( * ) Notice: Subject to any disclaimer, the term of this patent is extended or adjusted under 35 U.S.C. 154(b) by 615 days.

(21) Appl. No.: 17/276,417

(22) PCT Filed: Oct. 4, 2019

(86) PCT No.: PCT/EP2019/076887
§ 371 (c)(1),
(2) Date: Mar. 15, 2021

(87) PCT Pub. No.: WO2020/070275
PCT Pub. Date: Apr. 9, 2020

(65) Prior Publication Data
US 2022/0069402 A1 Mar. 3, 2022

(30) Foreign Application Priority Data
Oct. 5, 2018 (EP) ..................................... 18198784

(51) Int. Cl.
| | |
|---|---|
| *H01M 50/24* | (2021.01) |
| *A62C 3/16* | (2006.01) |
| *B32B 5/26* | (2006.01) |
| *B32B 7/12* | (2006.01) |
| *H01M 10/0525* | (2010.01) |
| *H01M 10/62* | (2014.01) |

(52) U.S. Cl.
CPC .............. *H01M 50/24* (2021.01); *B32B 5/26* (2013.01); *B32B 7/12* (2013.01); *H01M 10/62* (2015.04);
(Continued)

(58) Field of Classification Search
CPC .... H01M 50/24; H01M 10/62; H01M 50/143; H01M 50/231; H01M 10/0525;
(Continued)

(56) References Cited

U.S. PATENT DOCUMENTS 5,735,098 A * 4/1998 Kanai .................... E04B 1/948
52/506.01
5,985,013 A 11/1999 Kofler et al.
(Continued)

FOREIGN PATENT DOCUMENTS

| EP | 1 069 172 A2 | 1/2001 | |
|---|---|---|---|
| EP | 3000592 A1 * | 3/2016 | ........... B32B 19/045 |

(Continued)

OTHER PUBLICATIONS

International Search Report for PCT/EP2019/076887 dated Dec. 18, 2019, 6 pages.
(Continued)

*Primary Examiner* — Daniel S Gatewood
(74) *Attorney, Agent, or Firm* — Sand, Sebolt & Wernow (57) ABSTRACT

Fire protection device with composite system, composite system and battery pack with fire protection device.
The present application describes a fire protection device comprising
(a) a composite system including
(a1) a carrier layer,
(a2) an adhesive layer, and
(a3) a fire protection layer containing at least one ablative-acting compound,
and
(b) a shell inside which the composite system is arranged.
The fire protection device can be used in battery packs, in order to avoid overheating and/or contain a fire in the battery pack.

19 Claims, 3 Drawing Sheets

(51) Int. Cl.
 H01M 50/143 (2021.01)
 H01M 50/204 (2021.01)
 H01M 50/231 (2021.01)
(52) U.S. Cl.
 CPC ....... H01M 50/143 (2021.01); H01M 50/231 (2021.01); *A62C 3/16* (2013.01); *B32B 2250/02* (2013.01); *B32B 2250/20* (2013.01); *B32B 2255/02* (2013.01); *B32B 2255/20* (2013.01); *B32B 2262/101* (2013.01); *B32B 2307/3065* (2013.01); *B32B 2457/10* (2013.01); *H01M 10/0525* (2013.01); *H01M 50/204* (2021.01); *H01M 2200/10* (2013.01)
(58) Field of Classification Search
 CPC ........... H01M 50/204; H01M 2200/10; H01M 50/256; B32B 5/26; B32B 7/12; B32B 2250/02; B32B 2250/20; B32B 2255/02; B32B 2255/20; B32B 2262/101; B32B 2307/3065; B32B 2457/10; B32B 5/022; B32B 15/09; B32B 15/14; B32B 15/18; B32B 27/08; B32B 27/12; B32B 27/32; B32B 2260/021; B32B 2260/046; B32B 27/36; B32B 2307/718; B32B 2307/72; B32B 15/085; B32B 15/20; B32B 33/00; A62C 3/16; A62C 2/065; Y02E 60/10
See application file for complete search history.

(56) References Cited

U.S. PATENT DOCUMENTS

| | | | |
|---|---|---|---|
| 2005/0170023 A1 | 8/2005 | De La Mettrie | |
| 2005/0170238 A1 | 8/2005 | Abu-Isa et al. | |
| 2011/0064997 A1* | 3/2011 | Peskar | H01M 50/236 |
| | | | 429/185 |
| 2011/0126957 A1* | 6/2011 | Wierzbicki | C09K 21/02 |
| | | | 156/60 |
| 2011/0192564 A1* | 8/2011 | Mommer | H01M 10/613 |
| | | | 165/10 |
| 2012/0225331 A1 | 9/2012 | Tartaglia | |
| 2015/0231867 A1* | 8/2015 | Kelly | B32B 3/28 |
| | | | 428/533 |

FOREIGN PATENT DOCUMENTS

| | | | | |
|---|---|---|---|---|
| JP | H07-300912 A | | 11/1995 | |
| WO | WO-2011117269 A1 | * | 9/2011 | ............ B32B 15/08 |
| WO | WO-2014018107 A1 | * | 1/2014 | ............ A62C 2/06 |
| WO | 2018/195303 A1 | | 10/2018 | |

OTHER PUBLICATIONS

Espacenet bibliographic data sheet for JPH07-300912, published Nov. 14, 1995, 1 page.

* cited by examiner

FIRE PROTECTION DEVICE WITH A COMPOSITE SYSTEM, COMPOSITE SYSTEM AND BATTERY PACK WITH A FIRE PROTECTION DEVICE

FIELD OF THE INVENTION

The present application relates to a fire protection device comprising a composite system and optionally a shell, and to the use thereof. The present application further relates to a composite system and a battery pack comprising the fire protection device.

BACKGROUND OF THE INVENTION

There is currently a trend in the automotive industry to replace internal combustion engines with electric motors or a combination of electric motors and internal combustion engines, thereby lowering the environmental impact of automobiles by reducing (hybrids) or completely eliminating (electric vehicles) vehicle emissions. However, this shift in powertrain technology is not without technological hurdles, as the use of an electric motor entails the need for low-cost, rechargeable batteries (accumulators) with high energy density, long life, and diverse operating conditions. In addition, it is essential that a vehicle's battery does not pose an unreasonable health hazard either during vehicle use or storage.

Rechargeable batteries, such as lithium-ion cells, are more prone to thermal runaway than primary cells. Thermal runaway occurs when the internal reaction rate increases to the point where more heat is generated than can be removed, resulting in a further increase in both reaction rate and heat generation. Eventually, the amount of heat generated is large enough that it leads to the destruction of the battery cell (e.g., by overpressure (bursting) or by the emission of gases). In addition, fire development may occur.

Thermal runaway can be caused, for example, by a short circuit within the cell, improper use of the cell, manufacturing defects or extreme outside temperatures. In the case of a battery pack used in an electric vehicle, which contains several battery cells, a car accident can be the cause of simultaneous thermal runaway of several cells within the battery pack.

During a thermal runaway, a large amount of thermal energy is released rapidly, heating the entire cell to a temperature of 850° C. or more. The increased temperature of the thermal runaway cell also raises the temperature of neighbouring cells within the battery pack. If the temperature of the neighbouring cells increases unimpeded, they too can become thermally runaway. This cascade effect can mean that when a single cell undergoes thermal runaway, all cells in the entire battery pack end up undergoing thermal runaway.

There are several approaches to either reduce the risk of thermal runaway or to reduce the risk of thermal runaway propagation.

Battery packs have an enclosure that serves to protect the battery cells and contains devices that serve to air-condition and control the battery cells. By using specially designed enclosures, the risk of a short circuit during storage and/or handling can be reduced.

US 2005/01700238 A1 discloses a battery housing made of a glass fiber reinforced plastic.

US 2012/0225331 A1 discloses a battery pack in which a protective layer of a fiberglass material coated with a polymer is arranged inside a housing of a stable material. If a battery fails, the fabric retains the resulting gases. The housing absorbs the resulting forces.

Figure 1:
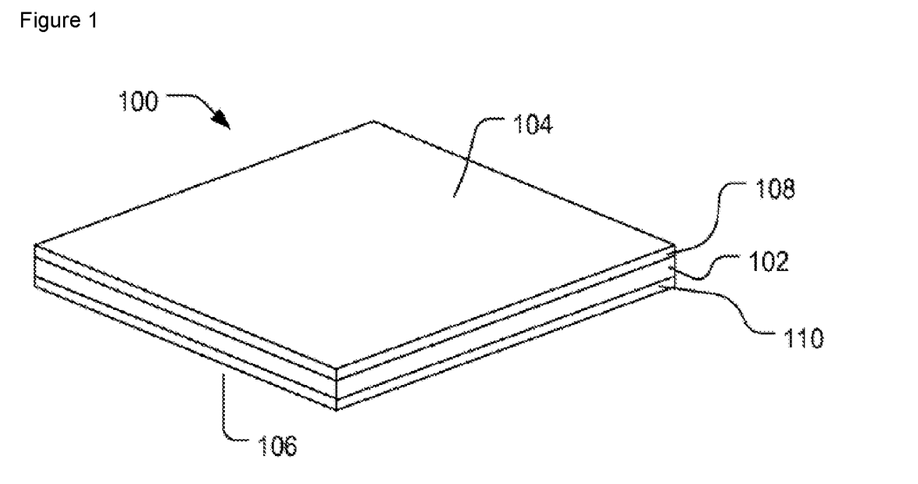
FIG. 1 depicts prior art.

From US 2011/0192564 A, a composite system is known, which is used for the protection of batteries. The composite system is shown in FIG. 1, according to which the upper layer (108) is an adhesive layer via which the composite system is bonded to an electrical energy storage device, such as a battery. This adhesive layer is followed by a foam layer (102), which in turn is connected to an outer layer (110). According to US 2011/0192564 A, the outer layer can be a glass fiber nonwoven. In this arrangement, ablative-acting compounds are optionally present in the foam layer (102). A disadvantage of this structure, which is known from US 2016/0192564 A, is that in the event of a heat effect, the ablative-acting compound can only act within the composite system, thus limiting its functionality. Direct action of the ablative compound on the battery is restricted by the adhesive layer provided between the fire protection layer and the battery.

From US 2011/064997 A, a battery is known which is provided in a housing. The housing is formed on the one hand by an ionomer layer which is in direct contact with the electrochemical cell. Further out (i.e., on the side of the ionomer layer opposite the electrochemical cell), a glass fiber nonwoven is provided. In the context of the teaching of US 2011/064997 A, the ionomer layer may include an intumescent component, such as graphite. The glass fiber nonwoven used in the teaching of US 2011/064997 A thus serves as a support layer and is not directly applied to the housing of the electrochemical cell (battery). This composite system, which is known from the prior art, has the disadvantage that the glass fiber nonwoven used as a carrier material does not have sufficient stiffness and thus a dimensionally stable embossing of the composite system is not possible. In addition, the production of an ionomer layer provided with an intumescent compound is complex and cost intensive.

WO 2014/018107 A relates to a laminate as a fire barrier for use in thermal and acoustic insulation. In a specific embodiment, a polyetheretherketone film is provided with a scrim and a thermal seal on one side and a silicone adhesive layer, a glass fiber layer and a fire barrier layer on the other side of the polyetheretherketone film. The production of the six-member laminate is costly because, in particular, a glass fiber fabric is first applied to the silicone adhesive and then a fire barrier layer is applied in a separate process step. In addition, the composite material is not suitable for plastic deformation because none of the aforementioned layers has sufficient stiffness.

Figure 2:
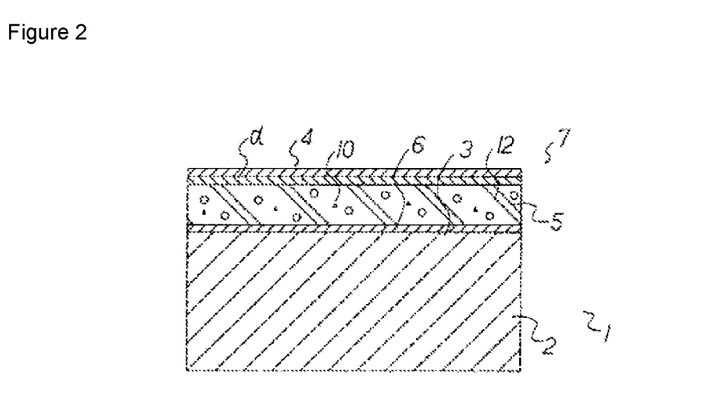
FIG. 2 depicts prior art.

JP H07300912 A discloses a composite system shown in FIG. 2. According to this, an adhesive layer is applied to a lower layer, which represents the carrier layer 2 and is formed by a glass fiber fabric layer. This adhesive layer is marked with reference 6. Subsequently, a heat-reducing layer 10 is arranged on the adhesive layer. This heat-reducing layer 10 may contain an ablative agent. Subsequently, a non-combustible layer 4 is arranged. The resulting composite body thus comprises a glass fiber fabric as a substrate material, which generally does not have sufficient stiffness for plastic deformability. In addition, production is complex and cost intensive.

U.S. Pat. No. 5,735,098 describes a fire protection composition comprising an ablative-acting compound and glass fiber. However, the fire protection composition of this prior art does not comprise a glass fiber nonwoven, nor a carrier material that has sufficient stiffness to plastically deform a possibly resulting composite body.

However, there is still a need to provide measures to reduce or eliminate heat and/or fire generated due to thermal runaway of one or more battery cells in a battery pack in order to prevent the heat and/or fire from spreading to other components of the device containing the battery cells. Preferably, these measures are also intended to prevent or at least limit the spread of an external fire to the battery pack.

Furthermore, it has been found in accordance with the invention that thermal runaway of batteries is at least partially associated with bursting of the battery, whereby burning metal particles can become detached and penetrate a fire protection device arranged around the battery. Therefore, a further requirement for fire protection devices according to the invention results from the fact that they are stable against burning metal particles which may be generated by the bursting of the battery.

DETAILED DESCRIPTION OF THE INVENTION

Figure 3:
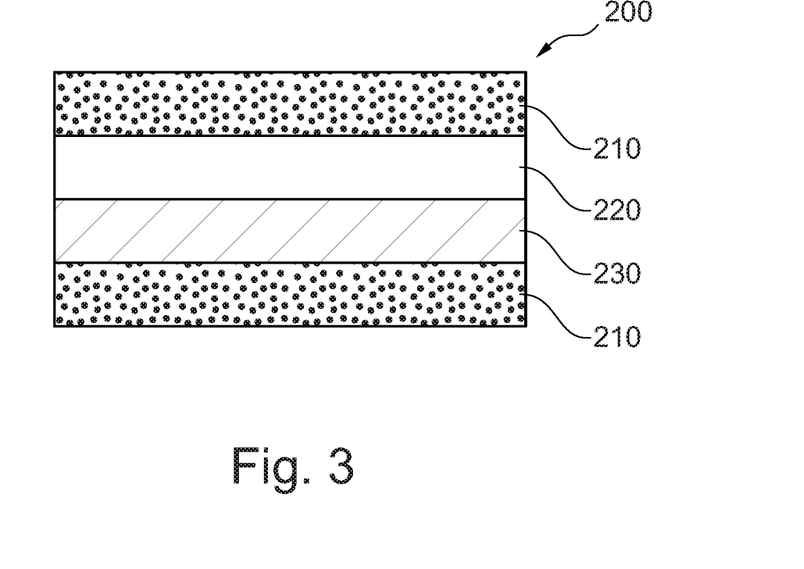
FIG. 3 depicts a fire protection system of the invention.
Figure 4:
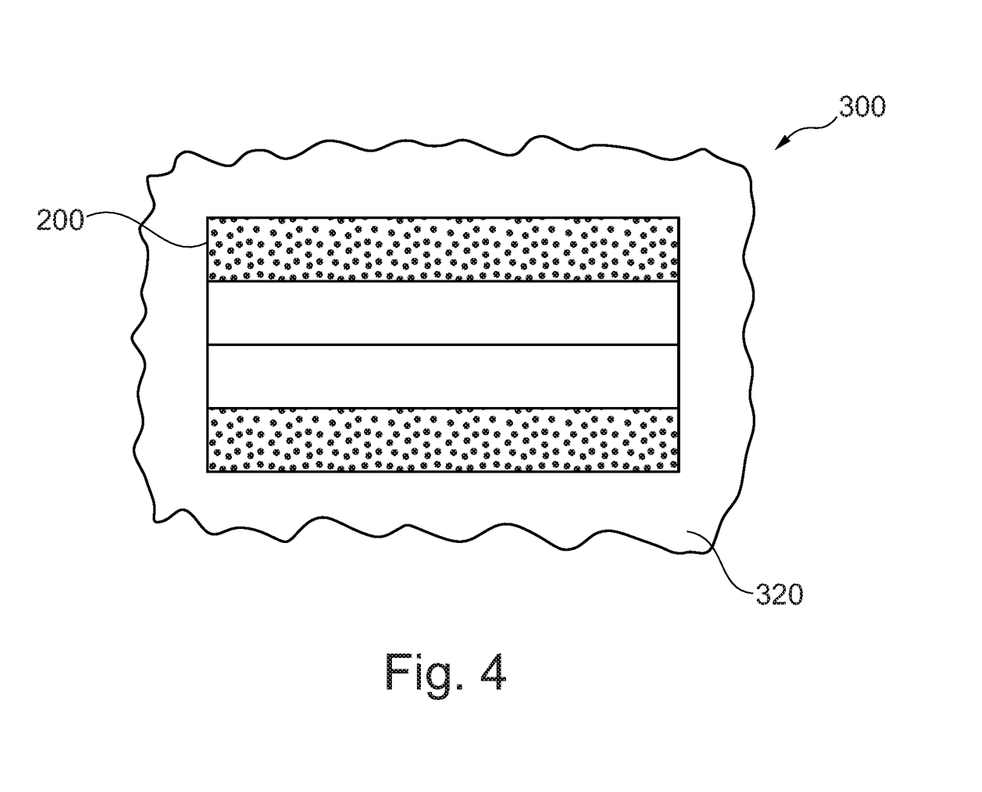
FIG. 4 depicts a shell encasing the fire protection system of the invention.

Referring to FIGS. 3 and 4, these tasks are solved by a fire protection device 300 comprising
(a) a composite system 200 comprising
  (a1) a carrier layer 220,
  (a2) an adhesive layer 230, and
  (a3) a fire-protection layer 210 which contains at least one ablative compound, and
(b) optionally, a shell 320 in which the composite system is arranged.

Figure 5:
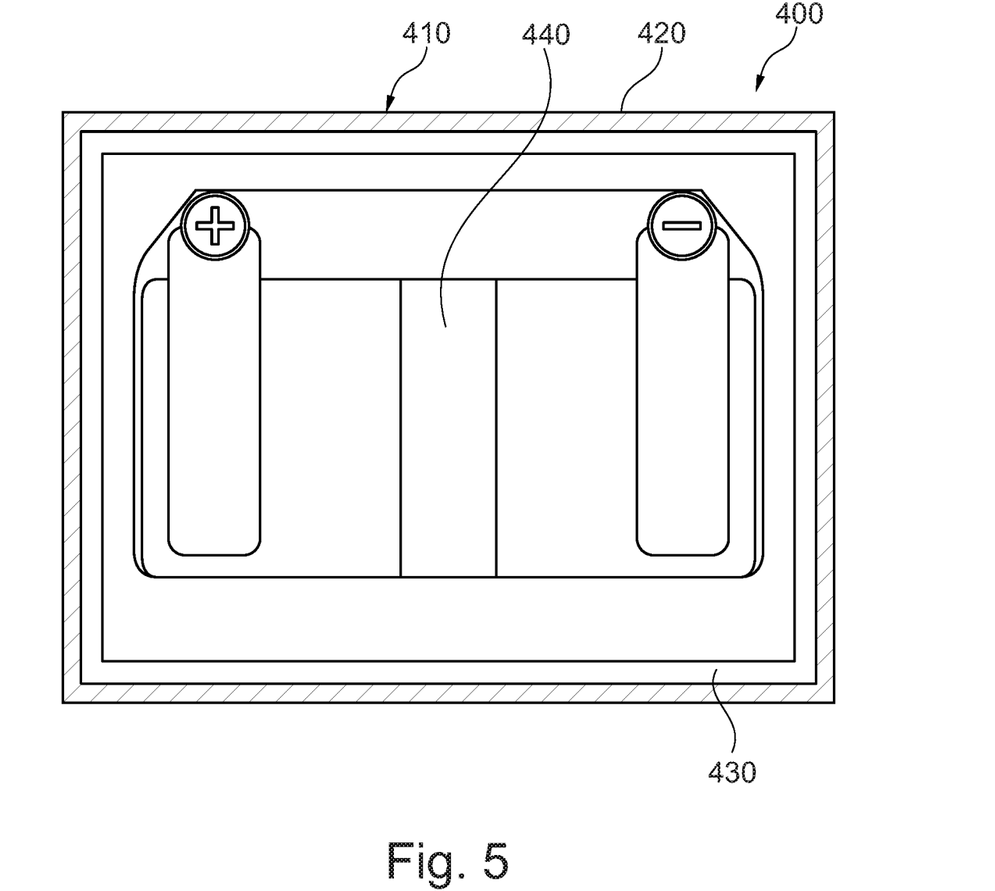
FIG. 5 depicts a lithium ion battery encased in a housing comprising the fire protection system of the invention.

Referring to FIGS. 4 and 5, such a fire protection device, which can be designed as a mat or plate, for example, can be fitted as heat and/or fire protection under the housing cover 410 and 420 (taken together) of a battery pack 400 for use in vehicles in order, on the one hand, to protect the battery cells 440 from external temperatures and/or the effects of fire and, on the other hand, to prevent heat and/or fire from spreading to other components of the vehicle and/or the passenger cell in the event of thermal runaway of battery cells.

In a preferred embodiment, it is provided in particular that the composite system with the fire protection layer 430, (where fire protection layer 430 contains the composite 200), which contains the at least one ablative compound, is arranged towards the battery.

In a further preferred embodiment, it is provided in particular that the composite system with the fire-protection layer containing the at least one ablative-acting compound is arranged in direct contact with the battery. In the context of the present invention, the feature "of direct contact with the battery" is understood to mean that no further layer of the composite system according to the invention is provided between the (outer side of the) battery and the composite system; contact between the battery housing and the fire protection layer is not mandatory.

If, in the context of the present invention, a direct arrangement of the fire protection layer on the battery housing is provided, it is avoided that the functioning of the ablative-acting compound contained in this fire protection layer is accompanied by bursting of the composite system used in the event of fire. Therefore, it is advantageous for the present invention if the layer containing the ablative compound, i.e., the fire protection layer, is in direct contact with the material made of the battery housing.

Alternatively, the fire protection device can be designed as a transport container and serve, for example, as a transport bag for lithium-ion batteries. In this embodiment, the fire protection device preferably has an opening, for example a positive closure device such as a zipper or a Velcro fastener, through which the battery pack can be inserted and removed.

If the fire protection device according to the invention is designed as a transport container, it is preferred if the fire protection device has plastic deformability. For this purpose, a special carrier material is recommended in particular, which is described below.

The fire protection device comprises a composite system and, if necessary, a shell in which the composite system is arranged.

The composite system has at least three layers:
(a1) a carrier layer,
(a2) an adhesive layer, and
(a3) a fire-protection layer.

The individual layers are described in more detail below:

Carrier Layer

The carrier layer of the composite system, which is generally also designed as an insulation layer, can be rigid or flexible.

The carrier layer comprises, for example, a glass fiber nonwoven or glass fiber fabric made of Alkaline earth silicate glass (AES glass), Electrical glass (E glass), E-glass corrosion resistant (ECR glass), silica glass, High strength glass (S glass), Reinforcement glass (R glass), Modulus glass (M glass), Chemical glass (C glass), Dielectric glass (D glass), Alkaline resistant glass (AR glass), T glass and/or Quartz glass (Q glass). In this regard, silica glass is preferred. In particular, silica fiber needle mats are preferred.

Preferably, the carrier layer contains a silicate fiber needle mat whose silicate fibers have fiber thicknesses in the range from 5 to 20 μm, preferably from 6 to 12 μm. Furthermore, silicate fiber needle mats with a density of 120 to 180 kg/m$^3$, preferably in the range of 150 kg/m$^3$, are preferably used, the silicate fiber needle mat furthermore preferably having a nominal basis weight of 500 to 2000 g/m$^2$, further preferably 600 to 1500 g/m$^2$, still more preferably 700 to 1300 g/m$^2$, and a nominal thickness of 2 to 15 mm, further preferably 3 to 12 mm, still more preferably 4 to 8 mm, being preferably specified. It has been shown that the proposed selection of the carrier material results in a dimensionally stable composite system. The silicate fiber mat preferably provided according to the invention also has the advantage that the resulting composite system is plastically deformable.

Corresponding silicate fiber needle mats are commercially available and are usually produced by means of needle technology and preferably without the addition of binders. The silicate fiber needle mats are preferably formed exclusively from silica glass fibers, the silica glass fibers being made of at least 94% by weight $SiO_2$, further preferably at least 96% by weight $SiO_2$, so that the resulting silicate fiber needle mat has sufficient temperature resistance. Corresponding silicate fiber needle mats are characterized by their excellent insulation properties as well as good vibration resistance. They have very good chemical resistance, high physical properties and a high mechanical load-bearing capacity, which makes their use as a carrier material particularly preferable, since the composite system according to the invention is preferably plastically deformable.

The carrier layer is bonded to a fire protection layer via an adhesive layer.

Adhesive Layer

The adhesive layer can contain, for example, a thermoplastic polymer film, synthetic rubber, water glass, polyurethane, or acrylate. Depending on the ingredients and filler materials, a distinction is made between a thermoplastic adhesive layer, a spray adhesive layer (synthetic rubber), an acrylate adhesive layer or a fire protection adhesive layer (water glass). Suitable thermoplastic polymers include, for example, acrylonitrile butadiene styrene (ABS), polyamides (PA), polylactate (PLA), polymethyl methacrylate (PMMA), polycarbonate (PC), polyethylene terephthalate (PET), polyethylene (PE), polypropylene (PP), polystyrene (PS), polyether ether ketone (PEEK), and polyvinyl chloride (PVC). Particularly preferably, the adhesive layer contains a thermoplastic polyethylene film.

Fire Protection Layer

The fire protection layer preferably comprises a nonwoven or woven glass fiber fabric coated with a fire protection composition comprising the at least one ablative-acting compound.

Preferably, the glass fiber nonwoven or the glass fiber fabric contains glass fibers made of Alkaline earth silicate glass (AES glass), Electrical glass (E glass), Electrical glass corrosion resistant (ECR glass), silica glass, High Strength glass (S glass), Reinforcement glass (R glass), Modulus glass (M glass), Chemical glass (C glass), Dielectric glass (D glass), Alkaline resistant glass (AR glass), T glass and/or Quartz glass (Q glass). Here, E glass is preferred.

In the context of the present invention, these materials are also suitable for forming the carrier layer. Therefore, the present invention also relates to a composite system in which the carrier layer and the fire protection layer comprise a glass fiber nonwoven or glass fiber fabric based on the above-mentioned glasses. In this embodiment, too, the glass fiber nonwoven or the glass fiber fabric are selected such that plastic deformability of the resulting composite system is provided. Corresponding materials for the glass fiber nonwoven or the glass fiber fabric are known per se to the skilled person.

Preferably, the fire protection layer contains a glass fiber nonwoven. Glass fiber nonwovens are known in many designs and for various applications. Also known are processes for producing glass fiber nonwovens from glass fibers and binder and, if necessary, other additives. The additives can improve certain properties, for example the hot water resistance, of the finished glass fiber nonwoven.

It is preferred that the basis weight of the glass fiber nonwoven is between 40 g/m² and 60 g/m².

The glass fibers of the glass fiber web preferably have a length in the range of 2 mm to 10 mm, more preferably in the range of 3 to 8 mm, and particularly preferably in the range of 4 to 7 mm.

As far as the binder of the glass fiber nonwoven is concerned, there is considerable scope here. Particularly advantageous binders are urea resins, modified polyvinyl alcohol, polyacrylic acid, water glasses, polyurethane (PU) binders and mixtures of the aforementioned binders. A modified polyvinyl alcohol is particularly preferred as a binder.

The glass fiber nonwoven or the glass fiber fabric is coated with a fire protection composition. The fire protection composition necessarily contains at least one ablative compound. It is particularly preferred that the nonwoven or woven glass fiber fabric contains two or more ablative compounds.

Due to the porosity of the glass fiber nonwoven or glass fiber fabric, the fire protection composition can penetrate into the nonwoven or fabric. Depending on the type of coating or impregnation of the nonwoven or fabric, the result is a single-layer structure consisting of nonwoven/fiberglass fabric and coating composition or a two-layer structure in which the nonwoven/fabric and the fire protection composition are still present separately.

An ablative compound is a compound that has a cooling effect when exposed to heat. In this process, bound water is released by endothermic processes and a cooling effect is generated. To achieve this ablative cooling, the ablative compound used can preferably be one that is ceramifying, carbonizing, sublimating or inflatable.

In a preferred embodiment, at least one ablative compound that ceramizes is used. The ceramization prevents, for example, flames from breaking through.

Preferred ablative-acting compounds are selected from the group consisting of $LiNO_3 \cdot 3H_2O$, $Na_2CO_3H_2O$ (Thermonatrite), $Na_2CO_3 \cdot 7H_2O$, $Na_2CO_3 \cdot 10H_2O$ (Soda), $Na_2Ca(CO_3)_2 \cdot 2H_2O$ (Pirssonite), $Na_2Ca(CO_3)_2 \cdot 5H_2O$ (Gaylussite), $Na(HCO_3)Na_2CO_3 \cdot 2H_2O$ (Trona), $Na_2S_2O_3 \cdot 5H_2O$, $Na_2O_3Si \cdot 5H_2O$, $KF \cdot 2H_2O$, $CaBr_2 \cdot 2H_2O$, $CaBr_2 \cdot 6H_2O$, $CaSO_4 \cdot 2H_2O$ (Gypsum), $Ca(SO_4) \cdot \frac{1}{2}H_2O$ (Bassanite), $Ba(OH)_2 \cdot 8H_2O$, $Ni(NO_3)_2 \cdot 6H_2O$, $Ni(NO_3)_2 \cdot 4H_2O$, $Ni(NO_3)_2 \cdot 2H_2O$, $Zn(NO_3)_2 \cdot 4H_2O$, $Zn(NO_3)_2 \cdot 6H_2O$, $(ZnO)_2(B_2O_3)_2 \cdot 3H_2O$, $Mg(NO_3)_2 \cdot 6H_2O$, $MgSO_4 \cdot 7H_2O$, $Mg(OH)_2$, $Al(OH)_3$, $Al(OH)_3 \cdot 3H_2O$, $AlOOH$ (Boehmite), $Al_2[SO_4]_3 \cdot nH_2O$ with $n=14-18$, $KAl(SO_4)_2 \cdot 12H_2O$, $CaO \cdot Al_2O_3 \cdot 10H_2O$ (Nesquehonite), $MgCO_3 \cdot 3H_2O$ (Wermlandite), $Ca_2Mg_{14}(Al,Fe)_4CO_3(OH)_{42} \cdot 29H_2O$ (Thaumasite), $Ca_3Si(OH)_6(SO_4)(CO_3) \cdot 12H_2O$ (Artinite), $Ca_6Al_2[(OH)_{12}|(SO_4)_3] \cdot 26H_2O$ (Ettringite), $3CaO \cdot Al_2O_3 \cdot 3CaSO_4 \cdot 32H_2O$ (Hydromagnesite), $Mg_5(OH)_2(CO_3)_4 \cdot 4H_2O$ (Hydrocalumite), $Ca_4Al_2(OH)_{14} \cdot 6H_2O$ (Hydrotalcite), $Mg_6Al_2(OH)_{16}CO_3 \cdot 4H_2O$ Alumohydrocalcite, $CaAl_2(OH)_4(CO_3)_2 \cdot 3H_2O$ (Scarbroite), $Al_{14}(CO_3)_3(OH)_{36}$ (Hydrogranate), $3CaO \cdot Al_2O_3 \cdot 6H_2O$ (Dawsonite), $NaAl(OH)CO_3$, (Hydrargillite, ATH), hydrous zeolites, vermiculites, colemanites, perlites, mica, alkali silicates, borax, modified carbons, graphites, silicas and mixtures thereof.

In a preferred embodiment of the invention, the ablative compound comprises mica, vermiculite and/or ettringite, in particular mica, vermiculite and/or synthetic ettringite.

In a preferred embodiment of the invention, the ablative-acting compound comprises ettringite. In a very preferred embodiment of the invention, the ablative-acting compound comprises synthetic ettringite.

Ettringite $(Ca_6Al_2[(OH)_{12}|(SO_4)_3]26H_2O)$ is a rarely occurring mineral from the mineral class of hydrous sulfates with foreign anions. Synthetic ettringite is offered, for example, in the form of aqueous suspensions. The aqueous suspensions may further comprise organic polymer-based binders, such as acrylates.

In another preferred embodiment of the invention, the ablative-acting compound comprises $Al(OH)_3$ (hydrargillite, ATH).

$Al(OH)_3$ is split at temperatures above 200° C. into aluminium oxide and water. The water cools the source of the fire and dilutes the gases produced. The resulting aluminium oxide forms a ceramic protective layer.

In a preferred embodiment, the fire protection composition comprises two or more ablative-acting compounds. It is further preferred that the fire-retardant composition comprises two ablative-active compounds. In this case, it is particularly preferred that the ablative compound comprises synthetic ettringite and Al(OH)$_3$.

The amount of ablative-active compound in the fire protection composition is preferably at least 50% by weight, more preferably at least 60% by weight, even more preferably at least 70% by weight, and most preferably at least 75% by weight, in each case based on the total weight of the fire protection composition.

To improve the application properties of the fire protection composition and/or the fire protection effect of the fire protection layer, the fire protection composition may contain further ingredients.

These other ingredients may include, in particular, defoaming agents, solvents, binders, thickeners, and/or expanded glass.

To prepare the fire protection composition, the ingredients are homogenized in a dissolver at room temperature (25° C.).

The fire protection composition is applied to the surface of the glass fiber or the glass fiber fabric on one side. This can be done by means of doctor blades or rollers, for example. The coated glass fiber nonwoven or glass fiber fabric is then dried, for example with the aid of a drying tunnel at temperatures around 190° C.

It is preferred that the basis weight of the fire protection layer is between 400 g/m$^2$ and 600 g/m$^2$.

In a further embodiment, the carrier layer of the composite system according to the invention can also be built up from one or more of the fire protection layers described above. If the carrier layer is built up from several of the fire protection layers described above, these are preferably bonded to one another via the adhesive layer described above.

Other Optional Layers

In a further embodiment, the composite system according to the invention comprises a coated glass fiber nonwoven or a coated glass fiber fabric, preferably the glass fiber nonwoven or glass fiber fabric described above, which, however, is not necessarily provided with the fire protection layer, but is designed in such a way that the glass fiber materials used have an increase in puncture resistance.

As an alternative to a corresponding coated glass fiber fleece or a coated glass fiber fabric, the composite system according to the invention can also have at least one stainless steel foil as a puncture barrier for burning metal particles from the battery. Corresponding layer thicknesses of the stainless-steel foils can be between 0.02 and 0.40 mm, more preferably 0.04 to 0.30 mm, still more preferably 0.05 to 0.20 mm.

In a further embodiment of the present invention, the composite system according to the invention comprises both a nonwoven or woven glass fiber fabric coated as described above and a stainless steel foil coated as described above.

General Description of the Compound System

The composite system is preferably located inside a shell. This shell can be of single- or multilayer design. In particular, the shell is preferably liquid-tight. The thickness of the shell is preferably between 100 and 200 μm.

In particular, the shell preferably has a multilayer structure and can, for example, comprise a composite film of polyethylene terephthalate, aluminium and polyethylene (PET/Al/PE) or polyethylene and polyethylene (PET/PE). Plastic films in general and self-adhesive films can also be used.

The composite system can, for example, be welded into the shell under vacuum or without vacuum. After the composite system has been welded into the shell, the fire protection device can be provided with one or more window(s) and/or a specific contour. Alternatively, the composite system can be provided with one or more window(s) and/or a specific contour before being welded into the shell.

The composite system is an important intermediate product in the manufacture of fireproofing.

Structure of the Composite System According to the Invention

The composite system according to the invention can comprise one or more layers selected from
    a) one or more glass fiber webs and/or glass fiber fabrics (with a reinforcing coating), optionally coated as described above;
    b) one or more stainless steel foils;
    c) one or more carrier layers; and
    d) one or more fire protection layers,
where the individual layers are usually bonded to each other via adhesive layers, A suitable composite system according to the invention has, for example, the following structure:
    Layer 1: fire protection layer with a glass fiber fleece, whereby the fire protection layer is directed to the outside of the composite system;
    Layer 2: stainless steel foil;
    Layer 3: glass fiber fabric or glass fiber fleece provided with a reinforcing coating;
    Layer 4: carrier layer;
    Layer 5: fire protection layer with a glass fiber fleece, whereby the fire protection layer is directed to the outside of the composite system.

Another suitable composite system according to the invention has, for example, the following structure:
    Layer 1: fire protection layer with a glass fiber fleece;
    Layer 2: fire protection layer with a glass fiber fleece (identical or different to layer 1);
    Layer 3: stainless steel foil;
    Layer 4: glass fiber fabric or glass fiber fleece provided with a reinforcing coating;
    Layer 5: carrier layer;
    Layer 6: fire protection layer with a glass fiber fleece (identical or different to layers 1 and 2); and
    Layer 7: fire protection layer with a glass fiber fleece (identical or different to layers 1, 2 and 7).

Accordingly, another subject matter of the present application is a composite system comprising.
    (a1) a carrier layer,
    (a2) an adhesive layer and
    (a3) a fire protection layer containing at least one ablative compound.

With regard to preferred embodiments of the composite system, the following applies mutatis mutandis to the fire protection device.

In particular, the fire protection device may be in the form of a mat or plate and may be part of a battery pack for use in a portable device (for example, a smartphone or a tablet computer) or an electric vehicle. In particular, the fire protection device may be part of a battery pack comprising at least one rechargeable lithium-ion battery cell for use in a portable device or an electric vehicle.

Accordingly, another subject matter of the present invention is a battery pack comprising
    (i) a housing,
    (ii) at least one rechargeable lithium ion battery cell, (iii) a fire protection device comprising
  (a) a composite system comprising.
    (a1) a carrier layer,
    (a2) an adhesive layer and
    (a3) a fire protection layer containing at least one ablative compound,
  and
  (b) optionally a shell inside in which the composite system is arranged.

In this battery pack of the present invention, the fire protection layer of the composite system is preferably arranged in the direction of the rechargeable lithium-ion battery cell. Between the rechargeable lithium-ion battery cell and the fire-protection layer of the composite system, one side of the envelope, if any, may be arranged.

With respect to preferred embodiments of the battery pack, what has been said for the fire protection device applies mutatis mutandis. Rechargeable lithium battery cells include in particular rechargeable lithium cobalt dioxide battery cells, rechargeable lithium titanate battery cells, rechargeable lithium manganese battery cells, rechargeable lithium iron phosphate battery cells, rechargeable lithium air battery cells, rechargeable dual carbon battery cells and/or lithium polymer battery cells. Typically, a battery pack has multiple rechargeable lithium battery cells connected in series. The battery pack may include further components. In particular, a battery management system (BMS) is included as a further component. The battery management system is preferably an electronic circuit which serves to monitor, control and protect the rechargeable lithium-ion battery cell(s). Battery packs are usually designed to be replaceable and have detachable electrical contacts.

A further embodiment of the present invention is the use of an inventive fire protection device in an assembly, comprising at least one rechargeable lithium ion battery cell.

With regard to preferred embodiments of use, what has been said for the fire protection device and the battery pack applies mutatis mutandis.

The present invention is again illustrated in more detail with reference to the following embodiments:

1. Composite system comprising
   (1) a carrier layer,
   (2) an adhesive layer, and
   (3) a fire protection layer containing at least one ablative compound.

2. Composite system according to item 1, characterized in that the ablative compound is selected from the group consisting of $LiNO_3 \cdot 3H_2O$, $Na_2CO_3 \cdot H_2O$ (Thermonatrite), $Na_2CO_3 \cdot 7H_2O$, $Na_2CO_3 \cdot 10H_2O$ (Soda), $Na_2Ca(CO_3)_2 \cdot 2H_2O$ (Pirssonite), $Na_2Ca(CO_3)_2 \cdot 5H_2O$ (Gaylussite), $Na(HCO_3)Na_2CO_3 \cdot 2H_2O$ (Trona), $Na_2S_2O_3 \cdot 5H_2O$, $Na_2O_3Si \cdot 5H_2O$, $KF \cdot 2H_2O$, $CaBr_2 \cdot 2H_2O$, $CaBr_2 \cdot 6H_2O$, $CaSO_4 \cdot 2H_2O$ (Gipsum), $Ca(SO_4) \cdot \frac{1}{2}H_2O$ (Bassanite), $Ba(OH)_2 \cdot 8H_2O$, $Ni(NO_3)_2 \cdot 6H_2O$, $Ni(NO_3)_2 \cdot 4H_2O$, $Ni(NO_3)_2 \cdot 2H_2O$, $Zn(NO_3)_2 \cdot 4H_2O$, $Zn(NO_3)_2 \cdot 6H_2O$, $(ZnO)_2(B_2O_3)_2 \cdot 3H_2O$, $Mg(NO_3)_2 \cdot 6H_2O$, $MgSO_4 \cdot 7H_2O$, $Mg(OH)_2$, $Al(OH)_3$, $Al(OH)_3 \cdot 3H_2O$, $AlOOH$ (Boehmite), $Al_2[SO_4]_3 \cdot nH_2O$ with $n=14-18$, $KAl(SO_4)_2 \cdot 12H_2O$, $CaO \cdot Al_2O_3 \cdot 10H_2O$ (Nesquehonite), $MgCO_3 \cdot 3H_2O$ (Wermlandite), $Ca_2Mg_{14}(Al,Fe)_4CO_3(OH)_{42} \cdot 29H_2O$ (Thaumasite), $Ca_3Si(OH)_6(SO_4)(CO_3) \cdot 12H_2O$ (Artinite), $Ca_6Al_2[(OH)_{12}|(SO_4)_3] \cdot 26H_2O$ (Ettringite), $3CaO \cdot Al_2O_3 \cdot 3CaSO_4 \cdot 32H_2O$ (Hydromagnesite), $Mg_5(OH)_2(CO_3)_4 \cdot 4H_2O$ (Hydrocalumite), $Ca_4Al_2(OH)_{14} \cdot 6H_2O$ (Hydrotalcite), $Mg_6Al_2(OH)_{16}CO_3 \cdot 4H_2O$ Alumohydrocalcite, $CaAl_2(OH)_4(CO_3)_2 \cdot 3H_2O$ (Scarbroite), $Al_{14}(CO_3)_3(OH)_{36}$ (Hydrogranate), $3CaO \cdot Al_2O_3 \cdot 6H_2O$ (Dawsonite), $NaAl(OH)CO_3$, $Al(OH)_3$ (Hydrargillite, ATH), hydrous zeolites, vermiculites, colemanites, perlites, mica, alkali silicates, borax, modified carbons, graphites, silicas and mixtures thereof.

3. Composite system according to item 1 or 2, characterized in that the ablative compound comprises ettringite, preferably synthetic ettringite.

4. Composite system according to one of the items 1 to 3, characterized in that the ablative compound comprises $Al(OH)_3$ (hydrargillite, ATH).

5. Composite system according to one of the items 1 to 4, characterized in that the ablative compound comprises synthetic ettringite and $Al(OH)_3$ (hydrargillite, ATH).

6. Composite system according to one of the items 1 to 5, characterized in that the fire protection layer comprises a glass fiber nonwoven or glass fiber fabric coated with a fire protection composition comprising the at least one ablative compound.

7. A fire protection device comprising
   (a) a composite system comprising
     (a1) a carrier layer,
     (a2) an adhesive layer and
     (a3) a fire protection layer containing at least one ablative compound,
   and
   (b) a shell inside which the composite system is arranged.

8. Fire protection device according to item 7, characterized in that the ablative compound is selected from the group consisting of $LiNO_3 \cdot 3H_2O$, $Na_2CO_3 \cdot H_2O$ (Thermonatrite), $Na_2CO_3 \cdot 7H_2O$, $Na_2CO_3 \cdot 10H_2O$ (Soda), $Na_2Ca(CO_3)_2 \cdot 2H_2O$ (Pirssonite), $Na_2Ca(CO_3)_2 \cdot 5H_2O$ (Gaylussite), $Na(HCO_3)Na_2CO_3 \cdot 2H_2O$ (Trona), $Na_2S_2O_3 \cdot 5H_2O$, $Na_2O_3Si \cdot 5H_2O$, $KF \cdot 2H_2O$, $CaBr_2 \cdot 2H_2O$, $CaBr_2 \cdot 6H_2O$, $CaSO_4 \cdot 2H_2O$ (Gipsum), $Ca(SO_4) \cdot \frac{1}{2}H_2O$ (Bassanite), $Ba(OH)_2 \cdot 8H_2O$, $Ni(NO_3)_2 \cdot 6H_2O$, $Ni(NO_3)_2 \cdot 4H_2O$, $Ni(NO_3)_2 \cdot 2H_2O$, $Zn(NO_3)_2 \cdot 4H_2O$, $Zn(NO_3)_2 \cdot 6H_2O$, $(ZnO)_2(B_2O_3)_2 \cdot 3H_2O$, $Mg(NO_3)_2 \cdot 6H_2O$, $MgSO_4 \cdot 7H_2O$, $Mg(OH)_2$, $Al(OH)_3$, $Al(OH)_3 \cdot 3H_2O$, $AlOOH$ (Boehmite), $Al_2[SO_4]_3 \cdot nH_2O$ with $n=14-18$, $KAl(SO_4)_2 \cdot 12H_2O$, $CaO \cdot Al_2O_3 \cdot 10H_2O$ (Nesquehonite), $MgCO_3 \cdot 3H_2O$ (Wermlandite), $Ca_2Mg_{14}(Al,Fe)_4CO_3(OH)_{42} \cdot 29H_2O$ (Thaumasite), $Ca_3Si(OH)_6(SO_4)(CO_3) \cdot 12H_2O$ (Artinite), $Ca_6Al_2[(OH)_{12}|(SO_4)_3] \cdot 26H_2O$ (Ettringite), $3CaO \cdot Al_2O_3 \cdot 3CaSO_4 \cdot 32H_2O$ (Hydromagnesite), $Mg_5(OH)_2(CO_3)_4 \cdot 4H_2O$ (Hydrocalumite), $Ca_4Al_2(OH)_{14} \cdot 6H_2O$ (Hydrotalcite), $Mg_6Al_2(OH)_{16}CO_3 \cdot 4H_2O$ Alumohydrocalcite, $CaAl_2(OH)_4(CO_3)_2 \cdot 3H_2O$ (Scarbroite), $Al_{14}(CO_3)_3(OH)_{36}$ (Hydrogranate), $3CaO \cdot Al_2O_3 \cdot 6H_2O$ (Dawsonite), $NaAl(OH)CO_3$, $Al(OH)_3$ (Hydrargillite, ATH), hydrous zeolites, vermiculites, colemanites, perlites, mica, alkali silicates, borax, modified carbons, graphites, silicas and mixtures thereof.

9. Fire protection device according to item 7 or 8, characterized in that the ablative compound comprises ettringite, preferably synthetic ettringite.

10. Fire protection device according to one of the items 7 to 9, characterized in that the ablative compound comprises $Al(OH)_3$ (hydrargillite, ATH).

11. Fire protection device according to one of the items 7 to 10, characterized in that the ablative compound comprises synthetic ettringite and $Al(OH)_3$ (hydrargillite, ATH).

12. Fire protection device according to one of the items 7 to 11, characterized in that the fire protection layer comprises a glass fiber nonwoven or glass fiber fabric coated with a fire protection composition comprising the at least one ablative-acting compound.

13. Fire protection device according to item 12, characterized in that the glass fiber fleece or the glass fiber fabric contains glass fibers of AES glass, E glass, ECR glass, S glass, R glass, M glass, C glass, D glass, AR glass, T glass and/or Q glass.

14. A battery pack comprising
(i) a housing,
(ii) at least one rechargeable lithium-ion battery,
(iii) a fire protection device comprising
  (a) a composite system comprising
    (a1) a carrier layer,
    (a2) an adhesive layer, and
    (a3) a fire-protection layer containing at least one ablative-active compound,
  and
  (b) a shell inside which the composite system is arranged.

15. Battery pack according to item 14, characterized in that the battery pack comprises a fire protection device according to one of items 6 to 12.

16. Use of a fire protection device according to any of items 7 to 13 in a device comprising at least one rechargeable battery cell, in particular a rechargeable lithium ion battery.

The invention claimed is:

1. A composite system comprising:
(a) a carrier layer, comprising a silica glass fiber needle mat,
(b) an adhesive layer,
(c) two fire protection layers having a single-layer structure and comprising a glass fiber nonwoven or glass fiber fabric penetrated with a fire protection composition comprising at least one ablative compound,
wherein the two fire protection layers are directed to the outside of the composite system;
and
a multilayer shell,
wherein the carrier layer, the adhesive layer and the two fire protection layers are contained inside the multilayer shell.

2. The composite system according to claim 1, wherein the ablative compound is selected from the group consisting of $LiNO_3 \cdot 3H_2O$, $Na_2CO_3 \cdot H_2O$, $Na_2CO_3 \cdot 7H_2O$, $Na_2CO_3 \cdot 10H_2O$, $Na_2Ca(CO_3)_2 \cdot 2H_2O$, $Na_2Ca(CO_3)_2 \cdot 5H_2O$, $Na(HCO_3)Na_2CO_3 \cdot 2H_2O$, $Na_2S_2O_3 \cdot 5H_2O$, $Na_2O_3Si \cdot 5H_2O$, $KF \cdot 2H_2O$, $CaBr_2 \cdot 2H_2O$, $CaBr_2 \cdot 6H_2O$, $CaSO_4 \cdot 2H_2O$, $Ca(SO_4) \cdot \frac{1}{2}H_2O$, $Ba(OH)_2 \cdot 8H_2O$, $Ni(NO_3)_2 \cdot 6H_2O$, $Ni(NO_3)_2 \cdot 4H_2O$, $Ni(NO_3)_2 \cdot 2H_2O$, $Zn(NO_3)_2 \cdot 4H_2O$, $Zn(NO_3)_2 \cdot 6H_2O$, $(ZnO)_2(B_2O_3)_2 \cdot 3H_2O$, $Mg(NO_3)_2 \cdot 6H_2O$, $MgSO_4 \cdot 7H_2O$, $Mg(OH)_2$, $Al(OH)_3$, $Al(OH)_3 \cdot 3H_2O$, $AlOOH$, $Al_2[SO_4]_3 \cdot nH_2O$ with $n=14\text{-}18$, $KAl(SO_4)_2 \cdot 12H_2O$, $CaO \cdot Al_2O_3 \cdot 10H_2O$, $MgCO_3 \cdot 3H_2O$, $Ca_2Mg_{14}(Al,Fe)_4CO_3(OH)_{42} \cdot 29H_2O$, $Ca_3Si(OH)_6(SO_4)(CO_3) \cdot 12H_2O$, $Ca_6Al_2[(OH)_{12}|(SO_4)_3] \cdot 26H_2O$, $3CaO \cdot Al_2O_3 \cdot 3CaSO_4 \cdot 32H_2O$, $Mg_5(OH)_2(CO_3)_4 \cdot 4H_2O$, $Ca_4Al_2(OH)_{14} \cdot 6H_2O$, $Mg_6Al_2(OH)_{16}CO_3 \cdot 4H_2O$, $CaAl_2(OH)_4(CO_3)_2 \cdot 3H_2O$, Scarbroit, $Al_{14}(CO_3)_3(OH)_{36}$, $3CaO \cdot Al_2O_3 \cdot 6H_2O$, $NaAl(OH)CO_3$, $Al(OH)_3$, hydrous zeolites, vermiculites, colemanites, perlites, mica, alkali silicates, borax, modified carbons, graphites, silicas and mixtures thereof.

3. The composite system according to claim 1, wherein the ablative compound comprises ettringite.

4. The composite system according to claim 1, wherein the ablative compound comprises $Al(OH)_3$.

5. The composite system according to claim 1, wherein the ablative compound comprises synthetic ettringite and $Al(OH)_3$.

6. A fire protection device comprising:
(a) a composite system comprising:
  (a1) a carrier layer, comprising a silica glass fiber needle mat,
  (a2) an adhesive layer, and
  (a3) two fire protection layers having a single-layer structure and comprising a glass fiber nonwoven or glass fiber fabric penetrated with a fire protection composition comprising at least one ablative compound,
  wherein the two fire protection layers are directed to the outside of the composite system,
  and
  a multilayer shell in which the carrier layer, adhesive layer and two fire protection layers are arranged, and
  wherein the two fire protection layers are directed to the outside of the composite system, and
(b) wherein the fire protection device is part of a battery pack, and the fire protection device is adapted to work with a rechargeable lithium battery cell.

7. The fire protection device according to claim 6, wherein the ablative compound is selected from the group consisting of $LiNO_3 \cdot 3H_2O$, $Na_2CO_3 \cdot H_2O$, $Na_2CO_3 \cdot 7H_2O$, $Na_2CO_3 \cdot 10H_2O$, $Na_2Ca(CO_3)_2 \cdot 2H_2O$, $Na_2Ca(CO_3)_2 \cdot 5H_2O$, $Na(HCO_3)Na_2CO_3 \cdot 2H_2O$, $Na_2S_2O_3 \cdot 5H_2O$, $Na_2O_3Si \cdot 5H_2O$, $KF_2H_2O$, $CaBr_2 \cdot 2H_2O$, $CaBr_2 \cdot 6H_2O$, $CaSO_4 \cdot 2H_2O$, $Ca(SO_4) \cdot \frac{1}{2}H_2O$, $Ba(OH)_2 \cdot 8H_2O$, $Ni(NO_3)_2 \cdot 6H_2O$, $Ni(NO_3)_2 \cdot 4\ H_2O$, $Ni(NO_3)_2 \cdot 2H_2O$, $Zn(NO_3)_2 \cdot 4H_2O$, $Zn(NO_3)_2 \cdot 6H_2O$, $(ZnO)_2(B_2O_3)_2 \cdot 3H_2O$, $Mg(NO_3)_2 \cdot 6H_2O$, $MgSO_4 \cdot 7H_2O$, $Mg(OH)_2$, $Al(OH)_3$, $Al(OH)_3 \cdot 3H_2O$, $AlOOH$, $Al_2[SO_4]_3 \cdot nH_2O$ with $n=14\text{-}18$, $KAl(SO_4)_2 \cdot 12H_2O$, $CaO \cdot Al_2O_3 \cdot 10H_2O$, $MgCO_3 \cdot 3H_2O$, $Ca_2Mg_{14}(Al,Fe)_4CO_3(OH)_{42} \cdot 29H_2O$, $Ca_3Si(OH)_6(SO_4)(CO_3) \cdot 12H_2O$, $Ca_6Al_2[(OH)_{12}|(SO_4)_3] \cdot 26H_2O$, $3CaO \cdot Al_2O_3 \cdot 3CaSO_4 \cdot 32H_2O$, $Mg_5(OH)_2(CO_3)_4 \cdot 4H_2O$, $Ca_4Al_2(OH)_{14} \cdot 6H_2O$, $Mg_6Al_2(OH)_{16}CO_3 \cdot 4H_2O$, $CaAl_2(OH)_4(CO_3)_2 \cdot 3H_2O$, Scarbroit, $Al_{14}(CO_3)_3(OH)_{36}$, $3CaO \cdot Al_2O_3 \cdot 6H_2O$, $NaAl(OH)CO_3$, hydrous zeolites, vermiculites, colemanites, perlites, mica, alkali silicates, borax, modified carbons, graphites, silicas and mixtures of any of the foregoing.

8. The fire protection device according to claim 6, wherein the ablative compound comprises ettringite.

9. The fire protection device according to claim 6, wherein the ablative compound comprises $Al(OH)_3$.

10. The fire protection device according to claim 6, wherein the ablative compound comprises synthetic ettringite and $Al(OH)_3$.

11. The fire protection device according to claim 6, wherein the glass fiber nonwoven or the glass fiber fabric contains glass fibers of alkaline earth silicate glass, electrical glass, electrical glass corrosion resistant, high strength glass, reinforcement glass, modulus glass, chemical glass, dielectric glass, alkaline resistant glass, T glass and/or quartz glass.

12. A battery pack comprising:
(i) a housing,
(ii) a rechargeable lithium-ion battery,
(iii) a fire protection device comprising:
  (a) a composite system comprising:
    (a1) a carrier layer, comprising a silica glass fiber needle mat,
    (a2) an adhesive layer, and
    (a3) two fire-protection layers having a single-layer structure and comprising a glass fiber nonwoven or glass fiber fabric penetrated with a fire protection composition comprising at least one ablative compound, and the two fire protection layers are directed to the outside of the composite system (b) a multilayer shell in which the composite system is arranged.

13. A method of protecting against fire, the method comprising providing the fire protection device according to claim 6, wherein the fire protection device comprises a rechargeable battery cell.

14. The composite system according to claim 1, wherein a basis weight of the fire protection layer ranges from 400 g/m² to 600 g/m².

15. The composite system according to claim 3, wherein the ablative compound comprises synthetic ettringite.

16. The composite system according to claim 1, wherein a basis weight of the glass fiber nonwoven ranges from 40 g/m² to 60 g/m².

17. The composite system according to claim 1, wherein an amount of the ablative compound is at least 50% by weight based on a total weight of the fire protection composition.

18. The fire protection device according to claim 8, wherein the ablative compound comprises synthetic ettringite.

19. A composite system comprising:

(a) a carrier layer, consisting of a silica glass fiber needle mat, (b) an adhesive layer, (c) two fire protection layers having a single-layer structure and comprising a glass fiber nonwoven or glass fiber fabric penetrated with a fire protection composition comprising at least one ablative compound, wherein the two fire protection layers are directed to the outside of the composite system, and a multilayer shell, wherein the carrier layer, the adhesive layer and the two fire protection layers are contained inside the multilayer shell.

* * * * *